United States Patent
Oh et al.

(10) Patent No.: US 8,361,419 B2
(45) Date of Patent: *Jan. 29, 2013

(54) CERIUM CARBONATE POWDER, METHOD FOR PREPARING THE SAME, CERIUM OXIDE POWDER MADE THEREFROM, METHOD FOR PREPARING THE SAME, AND CMP SLURRY COMPRISING THE SAME

(75) Inventors: Myoung Hwan Oh, Daejeon (KR); Jun Seok Nho, Daejeon (KR); Jong Pil Kim, Daejeon (KR); Jang Yul Kim, Daejeon (KR); Seung Beom Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 456 days.

This patent is subject to a terminal disclaimer.

(21) Appl. No.: 12/591,227

(22) Filed: Nov. 12, 2009

(65) Prior Publication Data
US 2010/0133466 A1   Jun. 3, 2010

Related U.S. Application Data

(63) Continuation-in-part of application No. 11/523,080, filed on Sep. 19, 2006, now abandoned.

(30) Foreign Application Priority Data

Sep. 20, 2005   (KR) .................. 10-2005-0087377

(51) Int. Cl.
*C01F 17/00* (2006.01)
(52) U.S. Cl. ...................... 423/21.1; 423/263
(58) Field of Classification Search ............... 423/21.1, 423/263
See application file for complete search history.

(56) References Cited

U.S. PATENT DOCUMENTS

| | | | |
|---|---|---|---|
| 4,497,785 A | 2/1985 | Tilley et al. | |
| 5,879,715 A | 3/1999 | Higgins et al. | |
| 5,994,260 A | 11/1999 | Bonneau et al. | |
| 7,976,810 B2 * | 7/2011 | Oh et al. | ........... 423/263 |
| 2002/0119093 A1 | 8/2002 | Murayama et al. | |

(Continued)

FOREIGN PATENT DOCUMENTS

| EP | 0 654 445 A1 | 5/1995 |
|---|---|---|
| JP | 64-052609 | 2/1989 |

(Continued)

OTHER PUBLICATIONS

Hsien-Cheng Wang et al., "Synthesis of Cerium Hydroxycarbonate Powders via a Hydrothermal Technique," Materials Research Bulletin 37 (2002) 783-792, Department of Chemical Engineering; National Taiwan University, Taipei 106, Taiwan, ROC.

(Continued)

*Primary Examiner* — Stanley Silverman
*Assistant Examiner* — Brian Walck
(74) *Attorney, Agent, or Firm* — McKenna Long & Aldridge LLP

(57) ABSTRACT

Disclosed is a method for preparing cerium carbonate powder by mixing a cerium precursor solution with a carbonate precursor solution to cause precipitation, wherein at least one solvent used in the cerium precursor solution and the carbonate precursor solution is an organic solvent. Cerium carbonate powder obtained from the method, cerium oxide powder obtained from the cerium carbonate powder, a method for preparing the cerium oxide powder, and CMP slurry comprising the cerium oxide powder are also disclosed. The method for preparing cerium carbonate using an organic solvent, allows the resultant cerium carbonate powder to have a size and shape controllable from the initial nucleation step. Additionally, it is possible to easily control the size and shape of cerium oxide powder obtained from the cerium carbonate powder.

8 Claims, 4 Drawing Sheets

U.S. PATENT DOCUMENTS

| | | |
|---|---|---|
| 2005/0036928 A1 | 2/2005 | Katusic et al. |
| 2006/0013752 A1 | 1/2006 | Lee et al. |
| 2006/0162260 A1 | 7/2006 | Nho et al. |
| 2007/0079559 A1* | 4/2007 | Oh et al. ............... 51/309 |

FOREIGN PATENT DOCUMENTS

| | | |
|---|---|---|
| JP | 04-198016 | 7/1992 |
| JP | 07-081932 | 3/1995 |
| JP | 07-144915 | 6/1995 |
| JP | 07-172826 | 7/1995 |
| JP | 08-134435 | 5/1996 |
| JP | 11-501898 | 2/1999 |
| JP | 11-322308 | 11/1999 |
| JP | 2002-201023 | 7/2002 |
| JP | 2003-252622 | 9/2003 |
| JP | 2004-107186 | 4/2004 |
| JP | 2005-0329287 | 2/2005 |
| JP | 2006-32966 | 2/2006 |
| JP | 2007-527945 | 10/2007 |
| KR | 10-2003-0055505 | 7/2003 |
| KR | 10-2003-0093193 A | 12/2003 |
| KR | 10-2005-0007445 A | 1/2005 |
| KR | 10-2005-0018754 A | 2/2005 |
| KR | 1020050060213 A | 6/2005 |
| WO | WO 2004/015021 | 2/2004 |
| WO | WO 2008114972 A1 * | 9/2008 |

OTHER PUBLICATIONS

M. Hirano et al., "Hydrothermal Synthesis of Two Types of Cerium Carbonate Particles," Journal of Materials Science Letters 18 (1999) 403-405, Department of Applied Chemistry, Aichi Institute of Technology, Yachigusa, Yakusa, Toyota, 470-0392, Japan.

Yasuro Ikuma et al., "Effect of Microwave Radiation on the Formation of $Ce_2O(CO_3)_2 \cdot H_2O$ in Aqueous Solution," Solid State Ionics 151 (2002) 347-352, Kanagawa Institute of Technology, Atsugi, Kanagawa 243-0292, Japan.

Song et al., "Synthesis and Performance of $CeO_2$ Nanocrystallines by Precipitation Method", Journal of Hunan University (Natural Sciences), vol. 31, No. 6, Dec. 2004, pp. 13-16 (with English abstract).

Wang et al., "Hydrogenation of Methyl Benzoate to Acetophenone over Ceria Catalyst", Journal of Fudan University (Natural Science), vol. 43, No. 4, Aug. 2004, pp. 615-620 (with English abstract).

* cited by examiner

2 Theta

CERIUM CARBONATE POWDER, METHOD FOR PREPARING THE SAME, CERIUM OXIDE POWDER MADE THEREFROM, METHOD FOR PREPARING THE SAME, AND CMP SLURRY COMPRISING THE SAME

This application is a continuation-in-part claiming priority to U.S. patent application Ser. No. 11/523,080, filed Sep. 19, 2006, which is based on Korean Application No. 10-2005-87377, filed Sep. 20, 2005, in Korean Industrial Property Office, the content of both are incorporated hereinto by reference.

TECHNICAL FIELD

The present invention relates to a method for preparing cerium carbonate powder, which uses an organic solvent having a dielectric constant different from that of water so as to control size and shape of cerium carbonate powder, cerium carbonate powder obtained by the same method, cerium oxide powder obtained from the cerium carbonate powder, a method for preparing the cerium oxide powder, and CMP slurry comprising the cerium oxide powder as an abrasive.

BACKGROUND ART

In general, cerium oxide is a high functional ceramic material that is widely used in catalysts, phosphors, cosmetics and abrasives. Recently, cerium oxide has been spotlighted as an abrasive in a STI (Shallow Trench Isolation) process and as an abrasive for optical glass. Such cerium oxide is generally prepared by a liquid-phase process, a solid-phase process, or the like. In the liquid-phase process, a pH modifier is added to a trivalent or tetravalent cerium starting material to directly form cerium oxide powder. On the other hand, in the solid-phase process, cerium oxide powder is formed by providing an intermediate product such as cerium carbonate and by performing a firing step.

Although the former process is useful for preparing fine particles because particles grow from a nucleation step, it has difficulty in preparing particles with a high crystallinity. On the other hand, the latter process has a disadvantage in that it produces macroparticles, which, in turn, should be processed into powder with a desired size by using a pulverization step.

Meanwhile, in one embodiment of the methods for preparing cerium carbonate powder in a solution according to the prior art, 0.05M cerium nitrate anhydrate is subjected to a hydrothermal reaction with 0.05~1.0M urea at a temperature of 160° C., while controlling size of the resultant powder to 200 nm~10 μm (Hsien-Cheng Wang, Chung-Hsin Lu, Synthesis of cerium hydroxycarbonate powders via a hydrothermal technique, Material Research Bulletin 1844, 1-10 (2002)). However, the above method is not amenable to mass production.

Additionally, in another embodiment of the methods for preparing cerium carbonate powder according to the prior art, cerium chloride, cerium sulfide or cerium nitrate anhydrate is subjected to a hydrothermal reaction with urea, while controlling crystallinity of the resultant powder depending on the kind of the salt, reaction temperature and reaction time, and urea concentration (M. Hirano, E. Kato, Hydrothermal synthesis of two types of cerium carbonate particles, Journal of Material Science Letter, 18, 403-405 (1999)). However, the above method is dangerous because it should be carried out at high temperature under high pressure. Also, the above method is not cost-efficient due to the cost required for the reaction system.

Further, in still another embodiment of the method for preparing cerium carbonate powder according to the prior art, cerium nitrate anhydrate and urea are used in a low concentration and the starting materials are subjected to a microwave process at a temperature of 80° C. so as to control the resultant powder to have a uniform spherical shape (Yasuro Ikuma, Hideyuki Oosawa, Eriko Shimada, Michiyo, Kamiya, Effect of microwave radiation on the formation of $Ce_2O(CO_3)_2 \cdot H_2O$ in aqueous solution, Solid State Ionics 151, 374-352 (2002)). However, the above method has difficulty in providing a mass production system and is not amenable to bulk production.

DISCLOSURE OF THE INVENTION

Therefore, the present invention has been made in view of the above-mentioned problems. The inventors of the present invention have found that when cerium carbonate powder is prepared by using an organic solvent as a solvent for forming at least one precursor solution of a cerium precursor solution and a carbonate precursor solution, it is possible to control the size and shape of the resultant cerium carbonate powder from the initial stage of powder preparation, and thus to easily control the size and shape of cerium oxide powder that may be prepared from the cerium carbonate powder.

Therefore, it is an object of the present invention to provide a method for preparing cerium carbonate by using an organic solvent as a solvent used in at least one precursor solution of a cerium precursor solution and a carbonate precursor solution, cerium carbonate powder obtained from the same method, cerium oxide powder obtained from the cerium carbonate powder, a method for preparing the cerium oxide powder, and CMP slurry comprising the cerium oxide powder.

According to an aspect of the present invention, there is provided a method for preparing cerium carbonate powder comprising mixing a cerium precursor solution with a carbonate precursor solution to cause precipitation, wherein at least one solvent used in the cerium precursor solution and the carbonate precursor solution is a water-soluble organic solvent, and the cerium precursor solution and the carbonate precursor solution contains only continuous phase, not containing non-continuous phase.

According to another aspect of the present invention, there is provided cerium carbonate powder in which carbon residue other than carbonate group (—$CO_3$) remains in an amount of 0.1 ppm~100 ppm.

According to still another aspect of the present invention, there is provided a method for preparing cerium oxide powder, the method comprising a step of firing the cerium carbonate powder obtained from the aforementioned method at a heat treatment temperature of 300° C.~1000° C. There is also provided cerium oxide powder obtained from the same method.

According to yet another aspect of the present invention, there is provided CMP slurry comprising 100 parts by weight of the above cerium oxide powder and 0.001~10 parts by weight of a dispersant.

Hereinafter, the present invention will be explained in more detail.

According to the present invention, cerium carbonate powder is obtained from a cerium precursor via a precipitation process. Preparation of cerium carbonate powder may be represented by the following reaction formula of:

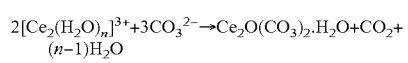

Cerium carbonate power is obtained from the reaction via a nucleation step and a nucleus growing step.

According to the prior art, water is used as a solvent for a cerium precursor solution as well as a carbonate precursor solution during preparation of cerium carbonate powder. On the contrary, the present invention is characterized by using an organic solvent as a solvent for at least one of a cerium precursor solution and a carbonate precursor solution, so as to control the size and shape of the resultant cerium carbonate powder.

Each solvent has a unique dielectric constant, and the change of dielectric constant of a solvent causes variations in surface energy, surface charge, etc., in a nucleation step and a crystal growing step during preparation of powder, thereby affecting agglomeration and growth of nuclei, and accordingly the size and shape of the resultant powder. When cerium carbonate powder is prepared via a liquid-phase precipitation process, use of water as a solvent may result in generation of large plate-like powder, and shows difficulty in controlling the size and shape of the resultant powder.

Therefore, according to the present invention, it is possible to control the size and shape of cerium carbonate powder by adjusting the dielectric constant of a solvent. Particularly, this can be accomplished effectively by using various organic solvents having different dielectric constant.

In one embodiment of the present invention, the cerium precursor solution uses, as a solvent, water, an organic solvent or a mixture of water with an organic solvent. Similarly, the carbonate precursor solution uses, as a solvent, water, an organic solvent or a mixture of water with an organic solvent. However, at least one of the cerium precursor solution and the carbonate precursor solution should be contain an organic solvent.

The dielectric constant of the organic solvent used in at least one of the precursor solutions is in proportion to the size of the resultant cerium carbonate powder. It is thought that such interrelation is caused by thermodynamic effects of the dielectric constant upon the reaction system and nucleus behavior. The organic solvent used in the present invention preferably has a dielectric constant of 20~80. Solvents having a dielectric constant less than 20 show too high volatility to be treated with ease, while solvents having a dielectric constant greater than 80 results in formation of undesirably coarse powder.

For reference, water has a dielectric constant of 80.37 (at 20° C.).

An organic solvent used in the present invention is preferably a water-soluble organic solvent. In case of using a water-soluble organic solvent, despite of mixing with water, a homogeneous solution can be formed so that dielectric constant of the solvent can be controlled easily.

Accordingly, the precursor solution of the present invention preferably contains only continuous phase, not containing non-continuous phase. In other words, at least one of the precursor solution should contain a water-soluble organic solvent, and the rest of the solvent can be water or a water-soluble organic solvent, resulting in forming a homogeneous solution containing only continuous phase, not containing non-continuous phase in the solution, such as micro-emulsion.

An organic solvent used in the present invention preferably has hydrophilic group, and non-limiting examples of such a hydrophilic group include hydroxyl group (—OH), ketone group (—CO—), carboxyl group (—COOH), sulfonic acid group (—$SO_3$H), amino group (—$NH_2$), ammonium group (—$NH_4$), etc.

Preferred examples of the organic solvent that may be used in the present invention include:

1) Alcohols: methanol, ethanol, propanol, butanol, etc.
2) Glycols: ethylene glycol, propylene glycol, butylene glycol, etc.
3) Others: acetone, glycerol, formic acid, ethyl acetate, etc.

Such organic solvents may be used alone or in combination. Additionally, the organic solvent for the cerium precursor solution may be the same as or different from the organic solvent for the carbonate precursor solution.

There is no particular limitation in the cerium precursor, as long as it contains cerium, and a cerium-containing salt is preferred. Non-limiting examples of the cerium precursor include cerium nitrate, cerium acetate, etc.

The carbonate precursor is a source of carbonate ions ($CO_3^{2-}$), and serves also as a pH modifier. Non-limiting examples of the carbonate precursor include carbonates, aqueous carbonic acid or oxalate. Among these salts, ammonium carbonate is preferred.

According to the present invention, the cerium precursor solution is mixed with the carbonate precursor solution and cerium carbonate powder is obtained from the mixture via precipitation.

Preferably, the cerium precursor solution and the carbonate precursor solution can be used in a molar concentration of 1:0.5~1:5. If the carbonate precursor is used in a concentration lower than the above ratio, the yield of cerium carbonate decreases. On the other hand, if the carbonate precursor is used at a concentration higher than the above ratio, a severe reaction occurs between both solutions, resulting in boiling of the reaction mixture.

Temperature during the precipitation is preferably in a range from 60° C. or higher to a temperature lower than the boiling point of the solvent used in the reaction. If the temperature is less than 60° C., the reaction cannot be completed, resulting in a drop in yield. If the temperature is higher than the boiling point of the solvent, the solvents may evaporate.

Preferably, precipitation can be performed for 30 minutes~60 hours. As can be seen from the following examples, a longer precipitation time provides a smaller particle size of cerium carbonate powder. It is thought that this is because the organic solvent contained in the solvent may serve as a reducing agent. Additionally, as the precipitation time increases, reaction degree also increases, which may affect the crystallinity of the resultant powder.

Preferably, the cerium carbonate powder obtained as described above is subjected to centrifugal separation and washing, and then is dried at about 90° C. for 24 hours.

Additionally, the cerium carbonate powder may have a size of 50 nm~5 μm. The size of cerium carbonate powder affects the size of cerium oxide powder obtained from the same. If the cerium carbonate powder has a size smaller than the above range, polishing rate decreases due to such excessively small cerium oxide powder obtained from the cerium carbonate. If the cerium carbonate powder has a size greater than the above range, surfaces to be polished may be scratched due to such excessively large cerium oxide powder obtained from the cerium carbonate.

Meanwhile, since the cerium carbonate powder is obtained from the above method characterized by using an organic solvent, the organic solvent may remain on the surface or inside of the cerium carbonate powder even after the centrifugal separation, washing and drying steps. The residual organic solvent may be analyzed by measuring carbon residue with TOC (Total Organic Carbon), or the like. Depending on the particular analysis system, carbonate groups (—$CO_3$) in cerium carbonate may be detected along with carbon residue. Thus, it is preferable to analyze carbon residue other than the carbonate groups. For examples, the cerium carbonate powder according to the present invention may contain carbon residue other than carbonate group ($-CO_3$) remaining in an amount of 0.1 ppm~100 ppm. Carbon residue less than the above range may be caused by analytical errors or may be detected in the case of using water alone as a solvent.

The cerium oxide powder according to the present invention may be obtained from the cerium carbonate powder via a powder preparing process based on high-temperature firing process known to those skilled in the art. Preferably, the method for preparing cerium oxide powder comprises a step of firing the cerium carbonate powder obtained from the aforementioned method at a temperature of 300° C.~1000° C.

Since the cerium oxide powder according to the present invention is obtained by using the cerium carbonate powder obtained from the aforementioned method as a precursor, the size and shape of the cerium carbonate powder affect those of the cerium oxide powder. In other words, the cerium oxide powder according to the present invention has a tendency to have a size and shape similar to those of the precursor, cerium carbonate powder. If is a matter of course that cerium carbonate powder may be cracked on surfaces or broken during the preparation of cerium oxide via heat treatment of cerium carbonate. Thus, the size and shape of cerium carbonate cannot be retained in the resultant cerium oxide. However, it is possible to control the size and shape of cerium oxide powder with ease by controlling the size and shape of cerium carbonate powder.

The CMP slurry comprising the cerium oxide powder as an abrasive may be prepared by dispersing the cerium oxide powder and a dispersant into a solvent.

The dispersant that may be used in the present invention includes a non-ionic polymer dispersant or an anionic polymer dispersant. The non-ionic polymer dispersant includes at least one compound selected from the group consisting of polyvinyl alcohol (PVA), ethylene glycol (EG), glycerin, polyethylene glycol (PEG), polypropylene glycol (PPG) and polyvinyl pyrrolidone (PVP). The anionic polymer dispersant includes at least one compound selected from the group consisting of polyacrylic acid, ammonium polyacrylate and polyacryl maleic acid. However, the above examples of dispersant are illustrative only, and the scope of the present invention is not limited thereto.

The dispersant is preferably used in an amount of 0.001~10 parts by weight based on 100 parts by weight of cerium oxide as an abrasive. More preferably, the dispersant is used in an amount of 0.02~3.0 parts by weight based on 100 parts by weight of cerium oxide. If the dispersant is used in an amount less than 0.001 parts by weight, rapid precipitation occurs due to low dispersibility, so that the abrasive cannot be supplied uniformly due to the precipitation during the transport of the polishing slurry. On the other hand, if the dispersant is used in an amount greater than 10 parts by weight, a dispersant polymer layer functioning like a cushioning layer may be formed in the vicinity of the abrasive particle, thereby making it difficult to allow the surface of the abrasive to be in contact with a silica surface to be polished, resulting in a drop in polishing rate.

In a preferred embodiment, the CMP slurry can be obtained by mixing cerium oxide powder with a dispersant in water and adjusting the pH to 6~8. For the pH adjustment, 1N KOH, 1N $HNO_3$, etc. may be used.

After the completion of the pH adjustment, the CMP slurry can be preferably subjected to a dispersion stabilization step in order to improve its dispersion and storage stability. The dispersion stabilization step may be performed by using a system generally known to those skilled in the art. For examples, an APEX mill (Kotobuki eng. & mfg. Co., Japan) may be used. When the dispersion stabilization step is performed by using the APEX mill, zirconia beads having a size of 0.01~1 mm can be used and cerium oxide slurry can be introduced thereto by using a pump at a rate of 10~1000 ml/min., and the mixture can be agitated in the mill at a rate of 2000~5000 rpm repeatedly for 1~20 passes.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention. It is to be understood that the following examples are illustrative only, and the scope of the present invention is not limited thereto.

In the following examples, cerium nitrate anhydrate (Junsei Co., purity 99.5%) and ammonium carbonate (Duksan Co., purity 99.5%) were used. Additionally, the following Table 1 shows dielectric constants of the solvents used in the following examples.

TABLE 1

| Solvent | Boiling Point (° C.) | Dielectric Constant at 20° C. |
| --- | --- | --- |
| Water | 100 | 80.37 |
| Ethanol | 78.3 | 25.3 |
| 1,4-Butanediol | 230 | 31.9 |
| Ethylene glycol | 197 | 41.4 |

Example 1

First, 0.1 mole of cerium nitrate anhydrate was dissolved into 100 ml of distilled water, and the solution was stirred at room temperature for 30 minutes. In a separate container, 0.2 mole of ammonium carbonate was dissolved into 100 ml of ethanol at 50° C. Then, the above two solutions were mixed with each other to cause precipitation at 75° C. for 6 hours. By doing so, cerium carbonate powder was obtained.

Figure 1:
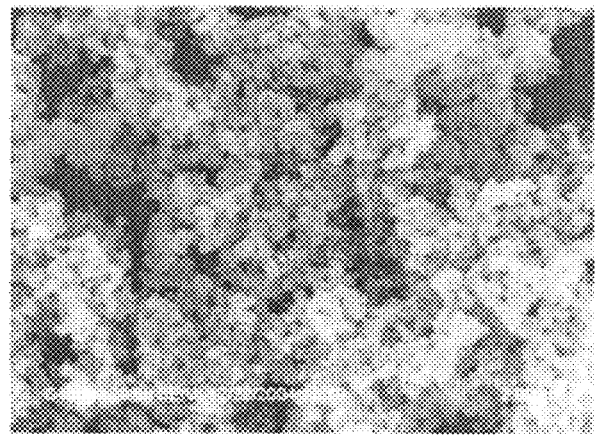
FIG. 1 is a photographic view of the cerium carbonate powder according to Example 1, taken by SEM (scanning electron microscopy)
Figure 8:
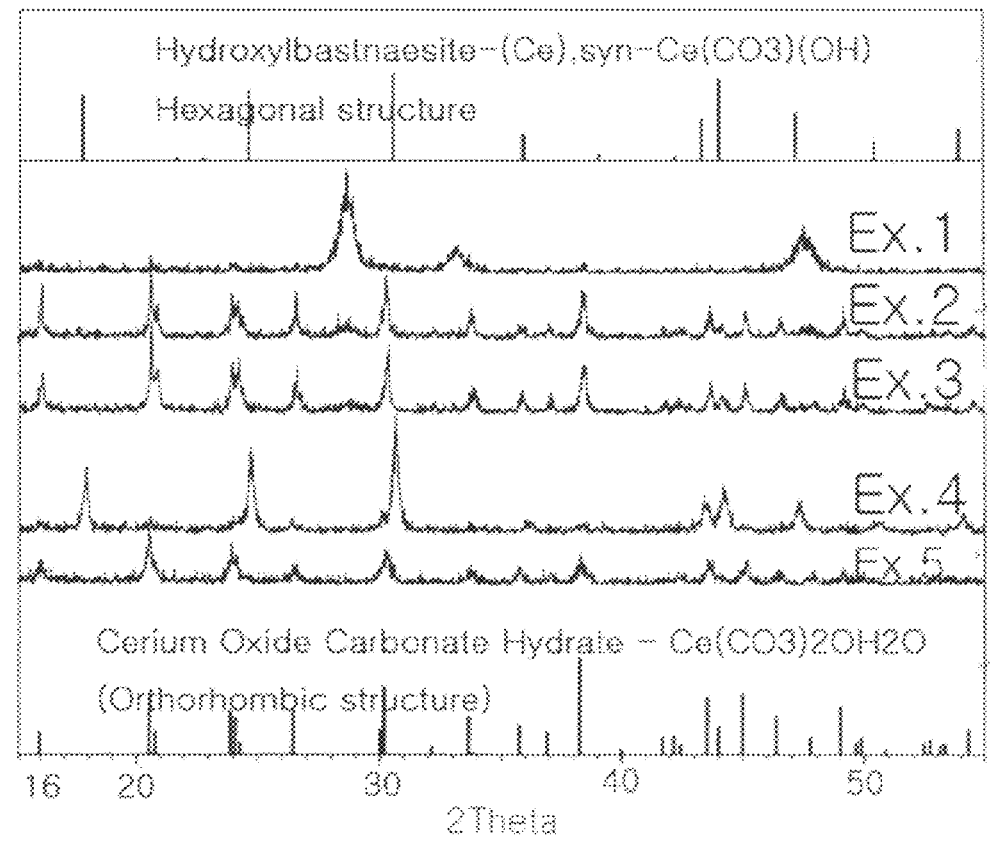
FIG. 8 is a graph showing the results of XRD (X-ray diffraction) analysis of cerium carbonate powder prepared in Examples 1~5.

The resultant cerium carbonate powder had a cubic structure and a uniform size of 100 nm. The particle shape is shown in FIG. 1 by using SEM at a magnification of ×20,000 (herein, each scale bar has a length of 2 μm). Additionally, crystallinity of the resultant powder is shown in FIG. 8 by using XRD.

Example 2

Cerium carbonate powder was obtained in the same manner as described in Example 1, except that 1,4-butanediol was used instead of ethanol and the reaction was performed at a temperature of 85° C. instead of 75° C.

Figure 2:
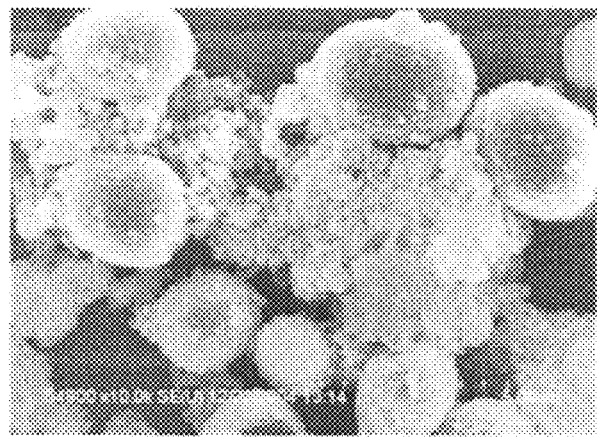
FIG. 2 is a photographic view of the cerium carbonate powder according to Example 2, taken by SEM.

The resultant cerium carbonate powder (cerium oxide carbonate hydrate-$Ce(CO_3)_2O \cdot H_2O$) had an orthorhombic structure and a size of about 2~3 μm. The particle shape is shown in FIG. 2 by using SEM at a magnification of ×10,000 (herein, each scale bar has a length of 5 μm). Additionally, crystallinity of the resultant powder is shown in FIG. 8 by using XRD.

Example 3

Cerium carbonate powder was obtained in the same manner as described in Example 1, except that ethylene glycol was used instead of ethanol and the reaction was performed at a temperature of 85° C. instead of 75° C.

Figure 3:
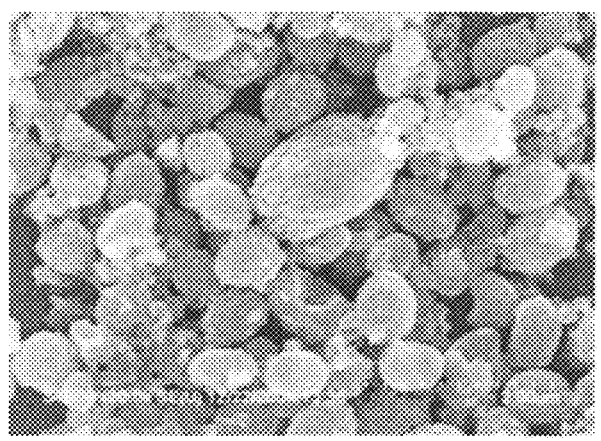
FIG. 3 is a photographic view of the cerium carbonate powder according to Example 3, taken by SEM.

The resultant cerium carbonate powder (cerium oxide carbonate hydrate-$Ce(CO_3)_2O \cdot H_2O$) had an orthorhombic structure and a size of about 500~600 nm. The particle shape is shown in FIG. 3 by using SEM at a magnification of ×20,000 (herein, each scale bar has a length of 2 μm). Additionally, crystallinity of the resultant powder is shown in FIG. 8 by using XRD.

In the above Example 1, the reaction was performed at 75° C., which was lower than the boiling point of ethanol. As can be seen from Examples 1~3, it is possible to vary the size and shape of cerium carbonate particles by varying the organic solvent used in the cerium precursor and carbonate precursor.

Example 4

Cerium carbonate powder was obtained in the same manner as described in Example 3, except that the precipitation was performed for 16 hours instead of 6 hours.

Figure 4:
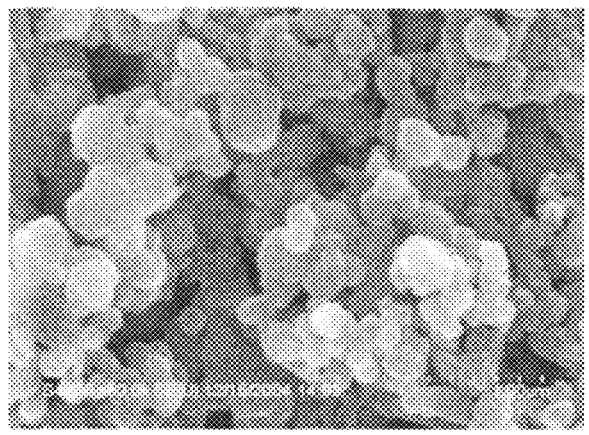
FIG. 4 is a photographic view of the cerium carbonate powder according to Example 4, taken by SEM.

The resultant cerium carbonate powder (Hydroxyl bastnaesite-(Ce), syn-$Ce(CO_3)(OH)$) had a hexagonal structure and a size of about 150 nm. The particle shape is shown in FIG. 4 by using SEM at a magnification of ×50,000 (herein, each scale bar has a length of 1 μm). Additionally, crystallinity of the resultant powder is shown in FIG. 8 by using XRD.

Comparing Example 4 to Example 3, it can be seen that a longer reaction time results in formation of cerium carbonate powder with a smaller particle size. It is thought that this is because the organic solvent may function as a kind of reducing agent.

Additionally, such longer reaction time allows sufficient progress of the reaction between both precursor materials, resulting in conversion of crystal structure of cerium carbonate from an orthorhombic structure into a hexagonal structure.

Example 5

Cerium carbonate powder was obtained in the same manner as described in Example 3, except that ethylene glycol was used as a solvent for cerium nitrate instead of distilled water.

Figure 5:
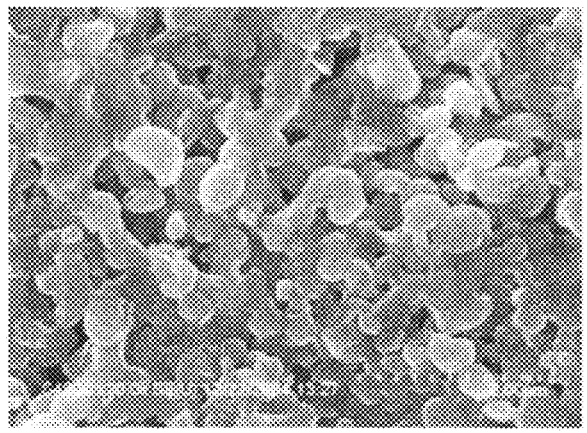
FIG. 5 is a photographic view of the cerium carbonate powder according to Example 5, taken by SEM.

The resultant cerium carbonate powder had an orthorhombic structure and a size of about 300 nm. The particle shape is shown in FIG. 5 by using SEM at a magnification of ×20,000 (herein, each scale bar has a length of 2 μm). Additionally, crystallinity of the resultant powder is shown in FIG. 8 by using XRD.

It can be seen from the above results that despite the same kind of solvent is used, a decrease in dielectric constant due to the variation of concentration result in cerium carbonate powder having a smaller particle size.

Comparative Example 1

Cerium carbonate powder was obtained in the same manner as described in Example 1, except that no organic solvent was used, both precursor solutions contained water as a solvent, and the reaction was performed at room temperature.

Figure 6:
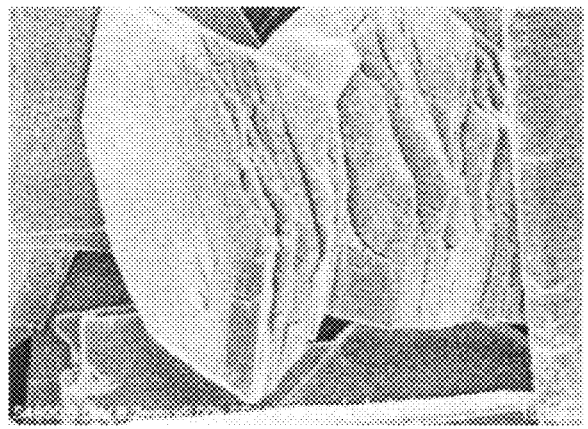
FIG. 6 is a photographic view of the cerium carbonate powder according to Comparative Example 1, taken by SEM.

The resultant cerium carbonate powder (Lanthanite-(Ce), syn-$Ce_2(CO_3)_3 \cdot H_2O$) had a plate-like structure and a particle size of 10~100 μm. The particle shape is shown in FIG. 6 by using SEM at a magnification of ×5,000 (herein, each scale bar has a length of 1 μm).

Comparative Example 2

Cerium carbonate powder was obtained in the same manner as described in Comparative Example 1, except that the reaction was performed at 85° C.

Figure 7:
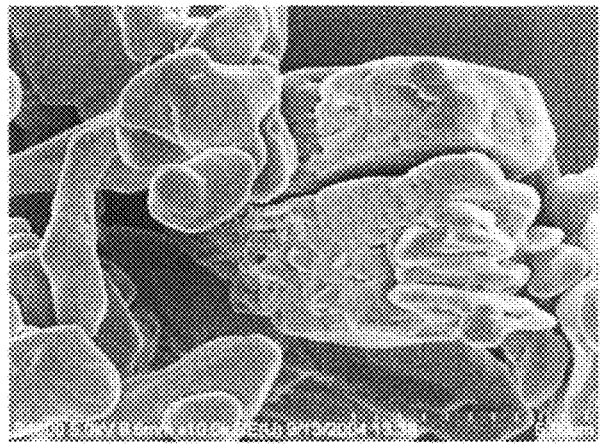
FIG. 7 is a photographic view of the cerium carbonate powder according to Comparative Example 2, taken by SEM.

The resultant cerium carbonate powder (Lanthanite-(Ce), syn-$Ce_2(CO_3)_3 \cdot H_2O$) had a plate-like structure. The particle shape is shown in FIG. 7 by using SEM at a magnification of ×10,000 (herein, each scale bar has a length of 5 μm).

Example 6

Preparation of Cerium Oxide Powder Using Cerium Carbonate Powder

The cerium carbonate powder prepared from Examples 1~5 was fired in an alumina crucible at 800° C. for 2 hours to provide cerium oxide powder.

Figure 9:
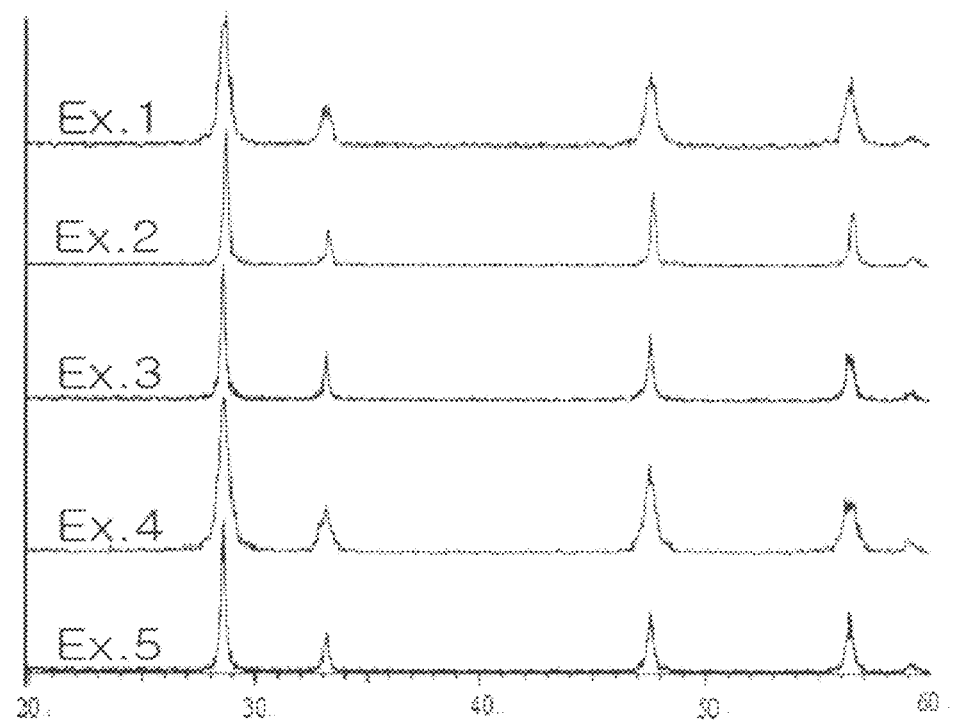
FIG. 9 is a graph showing the results of XRD analysis of cerium oxide powder according to Example 6, obtained by firing cerium carbonate powder prepared in Examples 1~5.
Figure 10:
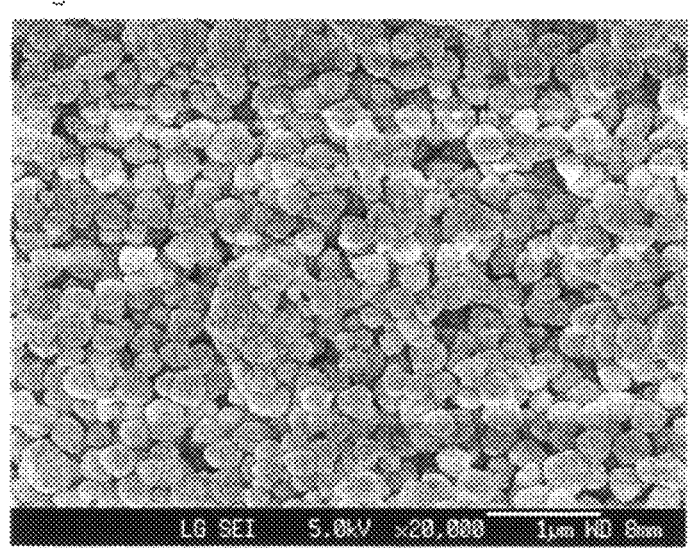
FIG. 10 is a photographic view of the cerium oxide powder, obtained by firing cerium carbonate powder prepared in Example 5, taken by SEM.

The resultant cerium oxide powder had a size and a shape similar to those of the cerium carbonate powder. After XRD analysis, it was shown that the cerium oxide powder had a cubic structure. FIG. 9 shows the crystallinity of the cerium oxide powder, while FIG. 10 shows a photographic view thereof taken by SEM.

INDUSTRIAL APPLICABILITY

As can be seen from the foregoing, the method for preparing cerium carbonate according to the present invention, characterized by using an organic solvent, allows the resultant cerium carbonate powder to have a size and shape controllable from the initial nucleation step. Additionally, it is possible to easily control the size and shape of cerium oxide powder obtained from the cerium carbonate powder.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for preparing cerium carbonate powder comprising mixing a cerium precursor solution with a carbonate precursor solution to cause precipitation,
   wherein at least one solvent used in the cerium precursor solution and the carbonate precursor solution is an organic solvent,
   wherein the organic solvent is at least one selected from the group consisting of glycols, acetone, glycerol, formic acid and ethyl acetate.

2. The method according to claim 1, wherein the organic solvent has a dielectric constant ranging from 20 to 80.

3. The method according to claim 1, wherein the cerium precursor solution and the carbonate precursor solution are used in a molar ratio ranging from 1:0.5 to 1:5.

4. The method according to claim 1, wherein the precipitation is carried out at a temperature ranging from 60° C. to the boiling point of the organic solvent used therein.

5. The method according to claim 1, wherein the precipitation is carried out for 30 minutes ~60 hours.

6. The method according to claim 1, wherein the cerium carbonate powder obtained from the method has a size of 50 nm~5 μm.

7. A method for preparing cerium oxide powder, which comprises the steps of:
   (a) preparing cerium carbonate powder by mixing a cerium precursor solution with a carbonate precursor solution to cause precipitation, wherein at least one solvent used in the cerium precursor solution and the carbonate precursor solution is an organic solvent, wherein the organic solvent is at least one selected from the group consisting of glycols, acetone, glycerol, formic acid and ethyl acetate; and
   (b) firing the cerium carbonate powder obtained from the step (a) at a heat treatment temperature of 300° C.~1000° C.

8. The method for preparing cerium oxide powder according to claim 7, wherein the organic solvent has a dielectric constant ranging from 20 to 80.

* * * * *